3,567,672
COATING COMPOSITION AND PROCESS COMPRISING CALCIUM SULFOALUMINATE PIGMENT, A RUBBERY LATEX BINDER AND A COPOLYMER OF STYRENE AND MALEIC MONOMER
Donald Graham Hobbs, Sarnia, Ontario, Canada, assignor to Polymer Corporation Limited, Sarnia, Ontario, Canada
No Drawing. Filed Apr. 8, 1968, Ser. No. 719,758
Claims priority, application Canada, May 3, 1967, 989,481
Int. Cl. C08d 13/18; C08f 41/12
U.S. Cl. 260—29.6
10 Claims

ABSTRACT OF THE DISCLOSURE

One or more of the problems associated with the preparation of a water-based coating composition of a mixture of a calcium sulfoaluminate pigment, a first binder of water-solubilized protein and/or polysaccharides, and a second binder being a rubbery polymer latex, is overcome by a process in which the first binder material is eliminated. The improved process uses the second binder material as the sole binder and this is accomplished by further including in the mixture from 0.5 to 5% by weight (based on the weight of calcium sulfoaluminate) of a water-solubilized copolymer of a styrene monomer with a maleic monomer in the ratio of 1:3 to 3:1 and having an average molecular weight of 1000–20,000. The improvement is especially applicable to the paper coating process.

---

The invention deals with aqueous dispersions of pigment used for paper coating and a process for producing the same.

In the paper industry, coatings are used consisting of pigment and adhesive dispersed in water. The pigments used are mainly clay, barium sulfate, calcium sulfoaluminate, calcium carbonate, aluminas and silicas, titanium pigments, zinc oxide and zinc sulfide and colorants. A dispersion in water of these pigments containing 40 to 70% of solids does not give a good paper coating if an adhesive or binder is not present. Adhesives used hitherto are generally starch adhesives, casein or isolated soy protein adhesives and synthetic rubber latex. Other ingredients may also be present such as dispersing agents (complex phosphate), defoamers and alkaline compounds increasing the pH (alkali, ammonia).

The use of calcium sulfoaluminate, known under the trade name "Satin White," gives characteristic qualities to the surfaces of papers and boards; high gloss, good printability and quick drying properties. It may be used as a mixture with less expensive pigments, particularly clay which is the major pigment used in the coating of paper and paperboard. The biggest problem in the application of Satin White is the tendency toward high viscosity in the coating mixtures containing Satin White. The viscosity behaviour is to a high degree dependent on the amount of Satin White in use. In this respect, adhesive containing water-solubilized proteins e.g. casein and latex dispersions are less troublesome than those containing solubilized polysaccharides e.g. cellulose and starch binders. The use of suitable cutting agents is of utmost importance in coating mixtures containing Satin White that employ for example casein or isolated soy protein as an adhesive. Sodium hydroxide, ammonia and trisodium phosphate, or a mixture of these components, are the agents most widely used as casein cutting agents in the preparation of coating mixtures containing Satin White. But, considerable trouble with "protein shock" may be encountered when the casein or isolated soy protein solution is first added to the pigment slurry, i.e. when the first 1 or 2% of casein or isolated soy protein is added, there is a considerable increase in viscosity and some pigment agglomeration. In formulating paper coating compositions, it is highly desirable that the composition have low initial viscosities and that these low initial viscosities be maintained throughout the life of the composition. Satin White formulations have been unsatisfactory in this respect, especially when a substantial proportion of the pigment, e.g. 30% was composed of Satin White and the pigment content was high, e.g. more than 35–40% and more especially if the formulation was subjected to some heating.

When Satin White is used, another disadvantage is that a larger amount of casein is required. In the application of Satin White as a pigment, about 30–60% or more but usually about 50% of casein relative to the amount of solid Satin White is required, varying with the raw stock quality, to attain requisite printing characteristics in the paper.

The state of the prior art may be found in the monograph series of the Technical Association of the Pulp and Paper Industry, particularly No. 28 "Pigmented Coating Processes for Paper and Board" (1964) and No. 30 "Paper Coating Pigments" (1966), where the chemical composition of Satin White is defined and will be referred to alternatively either as calcium sulfoaluminate or by its trade name Satin White throughout this specification. It would be desirable to substantially reduce or eliminate the necessity of using a co-binder with the latex when Satin White pigment is employed.

The present invention provides a means whereby Satin White may be employed in paper coating formulations while using a latex of a rubbery polymer as substantially the sole binder material and thus avoiding the use of a co-binder such as casein or starch as is presently believed to be required for best results. It also provides a means by which low initial viscosities may be attained and maintained until the compositions have been consumed by use.

According to the invention, viscosity problems associated with the use of Satin White may be overcome if 0.5 to 5% by weight, based on the weight of the Satin White present in the dispersions, of a special resin is added. The resin may be defined as an alkali soluble copolymer of a styrene with a maleic monomer selected from maleic anhydride, maleic acid, half esters of maleic acid and a $C_1$–$C_{18}$ monohydric alcohol, and mixtures thereof in a molar proportion of styrene:maleic monomer of about 1:3 to 3:1, and said copolymer having an average gram molecular weight between 1,000 and 20,000. The best results have been obtained with 2 to 5% by weight, based on the weight of the Satin White, of a resinous copolymer of styrene and maleic anhydride with a molar ratio of styrene:maleic anhydride of about 1:1 to 3:1, and said copolymer having a molecular weight comprised between 1,000 and 5,000. The most preferred resin is a styrene-maleic anhydride resin in a molar proportion of styrene:anhydride of about 1:1, having a molecular weight in the range of 1,500–2,500 and used in an amount of 3 to 4.5% by weight based on the weight of the Satin White.

The pigments which may be used with the invention are generally a mixture of the calcium sulfoaluminate with the other pigments, e.g. china clay, blanc fixe, etc. used in the paper coating industry. The amount of Satin White and the amount and nature of the other pigments depend on the type of paper coating aimed at, and may be determined by conventional testing. The range of Satin White usage may be between 5 and about 70% but usually is between 10 and 50% by weight on the total weight of all pigments and more specifically between 20 and 40%. The total amount of pigments in these dispersions may be 30 to 70, preferably 40 to 60% by weight of the dispersion.

The latexes which may be used in the present invention are those generally known to function as binders in the paper coating art. They are generally latexes of rubbery polymers prepared by polymerizing in aqueous emulsion ethylenically unsaturated monomers which may be mono- or polyunsaturated. Examples of the monomers include diolefines such as butadiene and substituted butadienes such as isoprene and chloroprene, mono-olefines such as vinyl aromatics such as styrene and substituted styrenes, acrylic acid and its nitriles and esters such as acrylonitrile, methyl acrylate, methyl methacrylate, butyl acrylate, methacrylic acid, acrylamide, maleic acid, itaconic acid, vinyl acetate, etc. Examples of the polymers are vinyl acetate-butyl acrylate copolymer, styrene-butyl acrylate copolymers, acrylonitrile-butadiene copolymers, styrene-butadiene copolymers, methacrylic acid-styrene-butadiene copolymers, methyl methacrylate-butadiene-styrene copolymers and acrylic acid-methyl methacrylate-butadiene copolymers. A preferred latex is at present a latex of a rubbery terpolymer of styrene, butadiene and acrylic acid. The type and amount of latex present in these dispersions is the type and amount of total adhesive i.e. binder generally used in the paper coating art in relation to the amount and nature of pigments used. As already mentioned, the amount of rubbery polymer latex adhesive used in the presence of Satin White—comprising pigment is larger than if there was the some amount of total pigment but not containing any Satin White at all. This amount of latex is such that the dry rubber comprises between about 10 and 30 parts by weight per hundred parts by weight of pigment and preferably between 18 and 25 parts. The latexes may contain as high as 70% or more of polymer solids.

The other components which are present in the aqueous dispersion of the invention are the agents used in the preparation of paper coating dispersions as they are known in the art. They include of necessity water, generally a dispersing agent (e.g. a complex phosphate such as sodium hexametaphosphate) and alkaline compounds such as sodium hydroxide or ammonia, and eventually other agents such as defoamers.

The final solids content of the aqueous dispersion of the invention depends on the components, the difficulty of mixing these components, the coating process and the paper coating aimed at, as it is known in the art. The solids content range generally used lies between 30 and 70% by weight, and preferably between 40 and 60%.

These aqueous dispersions of the invention have a viscosity which is lower, therefore better, than aqueous dispersions of the same composition but without the resin of the nature and in the amount hereinbefore described. Moreover, this viscosity does not increase as much with ageing or by heating as it does when these resins are omitted, and these aqueous dispersions are less expensive than dispersions of the same composition but using casein or isolated soy protein, either alone or in blend with latex as the adhesive portion.

The process of the invention consists in the use of the resins previously described in the amount specified in aqueous dispersions of pigments for paper coating where the adhesive consists in latex only. The sequence in which the different components of the dispersion are added is known in the art. It is preferred to prepare a thick paste of all the pigments except Satin White in a part of the water containing or to which is added eventually a suitable dispersant, then to mix it with a smooth paste obtained by the addition of the Satin White in the presence of a suitable dispersant, such as a complex phosphate, to an alkaline solution of the resins particularly styrene-maleic anhydride resin as previously described. The latex is the last component to be added and the solids content of the final mixture is then adjusted to the required level.

By this process, applicant has been able to obtain aqueous dispersions of low viscosity, these dispersions having minimal if any increase in viscosity on aging or heating.

The invention will be illustrated in the following examples, where all parts and percentages are by weight except as otherwise indicated.

EXAMPLE I (A) Dispersion A 40 parts of clay and 30 parts of barium sulfate are dispersed in 30 parts of water, using 0.3 part of "Calgon" (trademark for a brand of sodium hexametaphosphate) as dispersant. 1.5 parts of a styrene-maleic anhydride resinous copolymer, having a styrene:anhydride ratio of 1:1 and an average gram molecular weight of 2,000, were dissolved in a solution of 0.12 part of sodium hydroxide in 10 parts of water. An aqueous paste containing 30 parts of dry calcium sulfoaluminate (Satin White) was thoroughly mixed into this resin solution and mixing continued until a smooth paste was obtained. 0.3 part of "Calgon" was then added to this paste and mixing continued for a further 15 minutes. The clay/barium sulfate dispersion previously prepared is then added to the Satin White/resin mixture and mixed into a smooth paste. 44 parts of an aqueous latex containing 48% solids of a carboxylated styrene-butadiene rubbery copolymer having 60% bound styrene are then added and mixed thoroughly into the paste and finally water is added to obtain a 45% solids content.

(B) Dispersion B

This dispersion is made as Dispersion A with the only difference being that no styrene-maleic anhydride resinous copolymer is used.

(C) Dispersion C

This dispersion is made as Dispersion B with this difference that instead of 44 parts of carboxylated SBR latex, firstly 56 parts of an alkaline solution containing 25% of casein and then 14.5 parts of the same carboxylated SBR latex are added.

(D) Dispersion D

This dispersion is made as Dispersion B with this difference that instead of 44 parts of carboxylated SBR latex, firstly 28 parts of an alkaline solution containing 25% of casein and then 29 parts of this same carboxylated SBR latex are added.

(E) Dispersion E

This dispersion is made as Dispersion B with the difference that instead of 44 parts of carboxylated SBR latex, firstly 16.8 parts of an alkaline solution containing 25% of casein and then 35 parts of this same carboxylated SBR latex are added.

The viscosity of each of these dispersions was measured at 20° C. with a Brookfield viscometer using No. 4 spindle at a speed of 50 r.p.m. The measurements were made on the initial dispersion, after 4 hours, 24 hours, and after raising the temperature of the mixture to 50° C. and holding at this temperature for 15 minutes.

Results are indicated in Table I. From this table, it is noticed that the dispersion of the invention, i.e. Dispersion A, has a strikingly lower initial viscosity than any other dispersion containing no resin of the nature and in the amount described hereinbefore. Moreover, the low level of this initial viscosity is maintained during ageing or heating.

TABLE I

| Dispersion | A | B | C | D | E |
|---|---|---|---|---|---|
| Initial viscosity cp. at 25° C | 56 | 320 | 1,850 | 1,460 | 920 |
| 4 hour aged viscosity cp. at 25° C | 58 | 1,280 | 2,040 | 1,320 | 920 |
| 24 hour aged viscosity cp. at 25° C | 56 | Solid | 2,040 | 1,320 | 920 |
| Viscosity at 25° C. after heating the mix at 50° C. for 15 minutes cp | 60 | Solid | 1,880 | 2,840 | >4,000 |

EXAMPLE II

The same process as used for making Dispersion A in Example I was employed with the following components: 70 parts of clay; 1.5 part of the same styrene-maleic anhydride resinous copolymer; 30 parts of dry Satin White and 44 parts of the same carboxylated SBR latex. The same viscosity measurements were made on the 45% solids aqueous dispersion and the data are indicated in Table II.

TABLE II

| | |
|---|---|
| Initial viscosity cp. at 25° C. | 98 |
| 4 hour aged viscosity cp. at 25° C. | 98 |
| 24 hour aged viscosity cp. at 25° C. | 100 |
| Viscosity at 25° C. after heating the mix at 50° C. for 15 minutes cp. | 100 |

EXAMPLE III

The same dispersion and process as in Example I, Dispersion A, was used except that the nature of the latex used was different, the amount of dry solids of the latex remaining the same. Similar viscosity measurements are indicated in Table III.

TABLE III

| Nature of latex | Vinyl acetate/ butyl acrylate copolymer | Styrene/ butyl acrylate copolymer | Carboxylated styrene/ butadiene copolymer | Styrene/ butadiene latex |
|---|---|---|---|---|
| Initial viscosity cp | 120 | 800 | 480 | 240 |
| 4 hour aged viscosity cp | 160 | 829 | 800 | 240 |
| 24 hour aged viscosity cp | 160 | 860 | 800 | 320 |
| Viscosity after raising temperature of mix to 50° C. cp | | 880 | | 480 |

What is claimed is:

1. A process for preparing a water-based coating composition comprising forming an intimate mixture in water of (1) a paper coating pigment material of which calcium sulfoaluminate forms 5–70% by weight, (2) a binder material comprising a latex of a rubbery polymer prepared by aqueous emulsion polymerization said polymer selected from the group consisting of butadiene, isoprene, chloroprene, styrene, acrylic acid, acrylonitrile, methyl acrylate, methyl methacrylate, butyl acrylate, methacrylic acid, acrylamide, maleic acid, itaconic acid, vinyl acetate, vinyl acetate butyl acrylate copolymers, styrene-butyl acrylate copolymers, acrylonitrile-butadiene copolymers, styrene-butadiene copolymers, methacrylic acid-styrene-butadiene copolymers, methyl methacrylate-butadiene-styrene copolymers, acrylic acid-methyl methacrylate-butadiene copolymers and styrene-butadiene-acrylic acid copolymers, said binder material forming 10–30 parts by weight per 100 parts by weight of pigment material, and (3) 0.5–5% by weight, based on the weight of the calcium sulfoaluminate, of a water solubilized copolymer of a styrene monomer with a maleic monomer selected from maleic anhydride, maleic acid, half esters of maleic acid with a $C_1$–$C_{18}$ monohydric alcohol, and mixtures thereof, the molar ratio of said styrene to said maleic monomer being in the range of 1:3 to 3:1, said copolymer of the styrene and maleic monomers having an average molecular weight of 1000–20,000 and said coating composition having a total pigment solids content of 30–70% by weight.

2. A process according to claim 1 wherein the styrene monomer is styrene and the maleic monomer is maleic anhydride.

3. A process according to claim 2 wherein the styrene-maleic anhydride copolymer has an average molecular weight of 1000–5000.

4. A process according to claim 2 wherein the amount of styrene-maleic anhydride copolymer used is 2–5% based on the weight of the calcium sulfoaluminate.

5. A process according to claim 2 wherein the amount of latex binder used is such as to provide 18–25 parts by weight of rubbery polymer per 100 parts by weight of pigment material.

6. A process according to claim 2 wherein the calcium sulfoaluminate forms 10–50% by weight of the pigment material.

7. A process according to claim 6 wherein the pigment material forms 40–60% by weight of the coating composition; the latex binder provides 18–25 parts by weight of rubbery polymer per 100 parts by weight of pigment material; the styrene-maleic anhydride copolymer has an average molecular weight in the range of about 1000–5000, a molar ratio of styrene to maleic anhydride in the range of about 1:1 to 3:1 and is used in amount of 2–5% based on the weight of the calcium sulfoaluminate and said rubbery copolymer is a terpolymer of butadiene-1,3, styrene and acrylic acid.

8. A coating composition comprising an intimate mixture in water of (1) 30–70 parts by weight of a paper coating pigment material of which calcium sulfoaluminate forms 5–70% by weight, (2) 10–30 parts by weight per 100 parts by weight of said pigment material of a latex of a rubbery polymer prepared by aqueous emulsion polymerization said polymer selected from the group consisting of butadiene, isoprene, chloroprene, styrene, acrylic acid, acrylonitrile, methyl methacrylate, butyl acrylate, methacrylic acid, acrylamide, maleic acid, itaconic acid, rene-butyl acrylate copolymers, acrylonitrile-butadiene copolymers, styrene butadiene copolymers, methacrylic acid-styrene-butadiene copolymers, methyl methacrylate-butadiene-styrene copolymers, acrylic acid-methyl methacrylate-butadiene copolymers and styrene-butadiene-acrylic copolymers, (3) 0.5–5 parts by weight per 100 parts by weight of calcium sulfoaluminate of a water solubilized copolymer of a styrene monomer with a maleic monomer selected from maleic anhydride, maleic acid, half esters of maleic acid with a $C_1$–$C_{18}$ monohydric alcohol, and mixtures thereof, the molar ratio of said styrene to said maleic monomer being in the range of 3:1 to 1:3, said copolymer of the styrene and maleic monomers having an average molecular weight of 1,000–20,000 and (4) water in amount to yield a total solids content of 30–70% by weight.

9. Paper whenever coated with the coating composition of claim 8.

10. Paper whenever coated with a coating composition wherein said coating composition comprises an intimate mixture in water of (1) 40–60% by weight of the coating composition of pigment material wherein calcium sulfoaluminate forms 10–50% by weight of the pigment material, (2) a latex binder forming 18–25 parts by weight of rubbery polymer per 100 parts by weight of pigment material said rubbery polymer being a terpolymer of butadiene-1,3, styrene and acrylic acid, and (3) 2–5% by weight based on the weight of said calcium sulfoaluminate of a styrene-maleic anhydride copolymer said copolymer having an average molecular weight in the range of about 1000–5000 and a molar ratio of styrene to maleic anhydride in the range of about 1:1 to 3:1.

References Cited

UNITED STATES PATENTS

| | | | |
|---|---|---|---|
| 2,577,624 | 12/1951 | Niles | 117—155(U) |
| 2,661,308 | 12/1953 | Azorlosa | 117—155(UX) |
| 3,028,258 | 4/1962 | Rice | 117—155(UX) |
| 3,058,938 | 10/1962 | Lindstrom et al. | 117—155(UX) |
| 3,193,446 | 7/1965 | Eisenberg | 117—155(UX) |
| 3,368,987 | 2/1968 | Pollart et al. | 117—155(UX) |

JULIUS FROME, Primary Examiner

J. B. LOWE, Assistant Examiner

U.S. Cl. X.R.

117—155; 260—29.7, 41